United States Patent
Clark (10) Patent No.: US 8,995,763 B2
(45) Date of Patent: Mar. 31, 2015

(54) SYSTEMS AND METHODS FOR DETERMINING COMPRESSION METHODS TO USE FOR AN IMAGE

(71) Applicant: VMware, Inc., Palo Alto, CA (US)

(72) Inventor: Jonathan Clark, San Francisco, CA (US)

(73) Assignee: VMware, Inc., Palo Alto, CA (US)

(*) Notice: Subject to any disclaimer, the term of this patent is extended or adjusted under 35 U.S.C. 154(b) by 150 days.

(21) Appl. No.: 13/725,045

(22) Filed: Dec. 21, 2012

(65) Prior Publication Data
US 2014/0177957 A1    Jun. 26, 2014

(51) Int. Cl.
G06K 9/36    (2006.01)
G06T 9/00    (2006.01)

(52) U.S. Cl.
CPC ........................................ G06T 9/00 (2013.01)
USPC ........... 382/166; 382/232; 382/236; 382/239; 382/250

(58) Field of Classification Search
USPC ......... 382/169, 173, 232, 233, 236, 237, 239, 382/166, 250; 375/240.12, 240.21, 240.23, 375/E7.04, E7.094; 709/201, 203, 247
See application file for complete search history.

(56) References Cited

U.S. PATENT DOCUMENTS

| | | | |
|---|---|---|---|
| 6,771,827 B1 * | 8/2004 | Curry | 382/239 |
| 6,853,754 B2 * | 2/2005 | Curry | 382/237 |
| 6,937,767 B1 * | 8/2005 | Burak et al. | 382/232 |
| 7,123,771 B2 * | 10/2006 | Curry | 382/233 |
| 7,397,851 B2 * | 7/2008 | Roman | 375/240.01 |
| 7,581,027 B2 * | 8/2009 | Boliek et al. | 709/247 |
| 8,416,847 B2 * | 4/2013 | Roman | 375/240 |
| 8,639,045 B2 * | 1/2014 | Yokomitsu et al. | 382/232 |

* cited by examiner

Primary Examiner — Anh Do (57) ABSTRACT

Systems and methods described herein facilitate determining compression methods to use on an image. A client is in communication with a server that is configured to separate an image into a plurality of regions. The server is also configured to determine a first data compression method for a first set of the regions and a second data compression method for a second set of the regions, wherein the second data compression method is different from the first data compression method. Further, the server is configured to compress the first set and the second set of the regions by using the first data compression method and the second data compression method, respectively. The server is also configured to transmit the first set and the second set of the regions that have been compressed to the client.

23 Claims, 4 Drawing Sheets

SYSTEMS AND METHODS FOR DETERMINING COMPRESSION METHODS TO USE FOR AN IMAGE

BACKGROUND

The delivery of graphical information over narrow bandwidth network connections often requires some compromise between network bandwidth, CPU resource usage, and image quality. There are multiple different image encoding schemes, or "formats," available, using various image compression technologies. Some image compression technologies are more appropriate for certain types of images than others. Therefore, it can be important to select a preferred image encoding scheme and compression technology for the particular image being transmitted in order to minimize bandwidth while preserving acceptable image quality.

Display remoting technologies exist whereby a user may view the graphical user interface (GUI) of a computer from a location remote from the computer. For example, Virtual Network Computing (VNC) is graphical user interface remoting standard that uses Remote Frame Buffer (RFB) protocol to allow a client to remotely control a computer system over a persistent TCP connection, typically using TCP port 5900. The RFB protocol allows a server to update the frame buffer displayed on a VNC viewer running on a client machine. In general terms, a frame buffer typically occupies a portion of RAM used for temporary storage of image data that is available for display. In the RFB protocol, the server sends image buffer data corresponding to small rectangles of the graphical user interface (GUI) to the client, which the client then assembles to reconstruct the GUI at the remote location. Some VNC implementations, such as RealVNC, available from RealVNC Ltd., of Cambridge, UK, use an HTTP server to provide a VNC viewer to the client as a Java applet, which then connects to the server for remote UI over a separate persistent TCP connection. Yet another VNC implementation, referred to as "ThinVNC," available from CybeleSoftware, Inc. of Wilmington, Del., uses the WebSocket protocol of HTML5 for remote access to a user interface. Another example of a technology that relies on HTML4 technology for display remoting is described in U.S. patent application Ser. No. 13/162,365, filed Jun. 16, 2011, which is incorporated herein by reference in its entirety.

One problem associated with remoting GUIs is the selection of an appropriate image format and corresponding compression method. The amount of compression that can be achieved directly impacts the bandwidth consumed in graphical display remoting and plays a key role in the latency and maximum frame rate. Various image digital encoding schemes and/or compression methods, such as a Portable Network Graphics (PNG) and a Joint Photographic Experts Group (JPEG) image encoding, which uses lossless and lossy compression methods, respectively, have been developed and used for compressing an image. Moreover, both PNG and JPEG compression methods are available to HTML5 based client applications.

However, the compression methods employed by PNG and JPEG image formats have limitations, and there are some types of images that are able to compress better with one type of compression method over the other. For example, while the PNG format uses a lossless compression method such that the exact original data can be reconstructed from the compressed data, the PNG format is unable to match JPEG compression ratios for video and photographic data. The JPEG format, however, is lossy, and as a result, the reconstructed image will not precisely match the original. Specifically, the JPEG compression method can generate visible artifacts of the compression at moderate compression ratios that are particularly noticeable when compressing text and sharp vector-based graphics—image types that are highly compressible using the PNG format. Because GUIs often have a mix of different types of image data—some portions containing text or vector-based graphics while other portions contain photographic images or color gradients, a selection of an encoding scheme that is appropriate for one area of a display may be unsatisfactory—e.g., too little compression or image compression artifacts—at another portion of the display. Furthermore, the locations of each type of image data within the GUI are not predictable.

BRIEF DESCRIPTION

Systems and methods described herein identify a preferred compression method to use on an image prior to the transmission of the image such that the image can be compressed according to the preferred method. A web client that is in communication with a web server that is configured to separate an image into a plurality of regions. The web server is also configured to determine a first data compression method for a first set of the regions and a second data compression method for a second set of the regions, wherein the second data compression method is different from the first data compression method. Further, the web server is configured to compress the first set and the second set of the regions by using the first data compression method and the second data compression method, respectively. The web server is also configured to transmit the first set and the second set of the regions that have been compressed to the web client.

DETAILED DESCRIPTION

Figure 1:
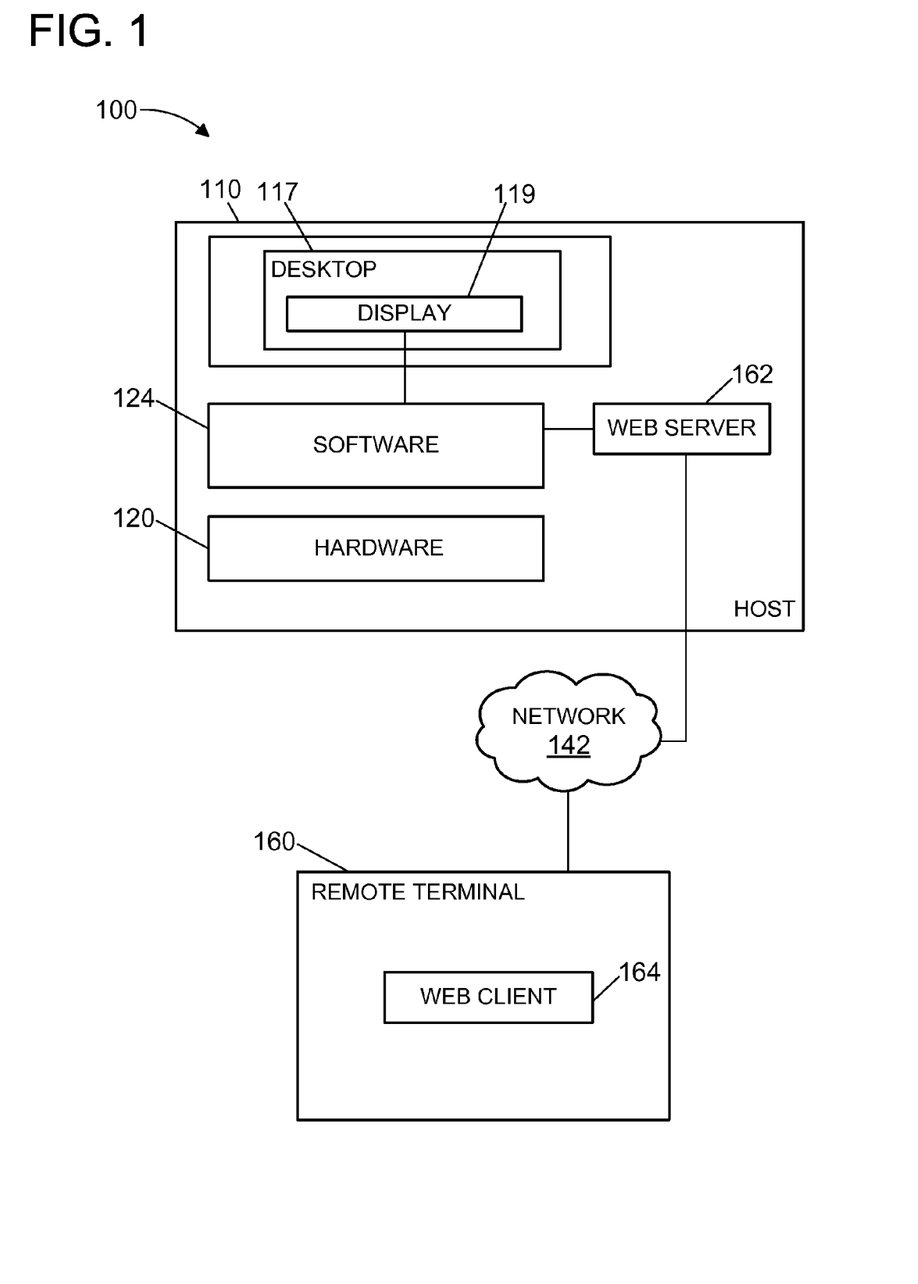
FIG. 1 is an exemplary system having a web server in communication with a web client.

FIG. 1 shows an exemplary system 100 that includes a physical computer system or host 110. Host 110 includes hardware 120 and software 124 running on the hardware 120 such that various applications may be executing on hardware 120 by way of software 124. Software 124 may be implemented directly in hardware 120, e.g., as a system-on-a-chip, firmware, FPGA, etc. Hardware 120 includes at least one processor (not shown), wherein each processor is an execution unit, or "core," on a microprocessor chip. Hardware 120 also includes a system memory (not shown), which is a general volatile random access memory (RAM), a network interface (NIC), and other devices.

In the exemplary embodiment, an end user may connect to, and interact with, host 110 using a remote terminal 160 that is capable of communicating with host 110 via a network 142, which may be the Internet, a LAN, a WAN, or any combination thereof. Remote terminal 160 may be a desktop computer, laptop, mobile device, thin client, or other similar device. Remote terminal 160 is capable of displaying applications running inside host 110 to the end user using a computer display (not shown) or similar device. Remote terminal 160 is also capable of receiving user input from the end user and transmitting the received user input to host 110.

The host 110 provides at least one desktop 117 (only one being shown in FIG. 1) to a user of host 110. (In a virtual desktop infrastructure (VDI) deployment, each desktop 117 may be exported from a corresponding one of a plurality of virtual machines to a plurality of users in disparate remote locations.) Desktop 117 is an interactive user environment provided by the applications running within host 110, and generally includes one or more screens or displays 119 (only one being shown in FIG. 1), but may include other outputs, such as audio, indicator lamps, tactile feedback, etc. Desktop 117 also accepts input from the user in the form of device inputs, such as keyboard and mouse inputs. Desktop 117 may also accept simulated inputs, such as simulated keyboard and mouse inputs. In addition to user input/output, desktop 117 may send and receive device data, such as input/output for a FLASH memory device local to the user, or to a local printer. In the exemplary embodiment, display 119 may be presented to an end user on the computer display of remote terminal 160.

In the exemplary embodiment, the host 110 also includes a server, such as web server 162 that is in communication with software 124 and with remote terminal 160 via network 142. Web server 162, in the exemplary embodiment, is configured to receive display updates from desktop 117 and to transmit the display updates as images to a client, such as web client 164, that is located within remote terminal 160 via communication channels (not shown). The display updates may include portions of desktop 117. Moreover, as explained in more detail below, web server 162 is configured to select, based on image content, a preferred compression method (e.g., by selecting a particular image encoding scheme) to use on an image prior to the transmission of the image to web client 164 without significantly increasing the load on remote terminal 160 and/or the host 110. The compression methods may include, for example, lossless compression, such as that provided by the PNG image encoding scheme, and lossy compression, such as that provided by the JPEG image encoding scheme. In some implementations, web server 162 may also be implemented on a stand-alone server (not shown). Web client 164, in the exemplary embodiment, is a web browser that is configured to run on the remote terminal 160 and connects to web server 162 as necessary to receive, for example, web content.

System 100 may be implemented on a physical desktop computer system, such as a work or home computer that is remotely accessed when travelling. Alternatively, system 100 may be implemented on a virtual desktop infrastructure (VDI) that has a plurality of virtual machines (VMs) (not shown) on host 110. In the latter case, software 124 may be virtualization software and one or more VMs (not shown) may be executing on hardware 120 by way of the virtualization software. It should therefore be understood that the present invention can be implemented in a variety of contexts, but may be particularly useful wherever graphical user interface display remoting is implemented.

During operation of system 100, as explained in more detail below, an image data format and corresponding compression method is selected for an image (e.g., image 170 (shown in FIG. 2)) such that image 170 is compressed in a preferred manner prior to the transmission of image 170 from web server 162 to web client 164. Embodiments for selecting preferred compression methods are described below with reference to FIGS. 4 and 5. It should be recognized that, while the description below references implementation using a web server and a web client (browser), other server-client implementations are possible and are contemplated. In general, upon receiving a web request that corresponds to a request for an image from web client 164, web server 162 receives image 170 from desktop 117. Prior to transmitting image 170 to web client 164, web server 162 determines one or more compression methods to use on image 170 such that image 170 is adequately compressed prior to being transmitted to web client 164. More specifically, web server 162 breaks or separates the image into a plurality of regions 172 (shown in FIG. 2), wherein each of the regions 172 can be classified for being compressed better using a type of compression method.

Figure 2:
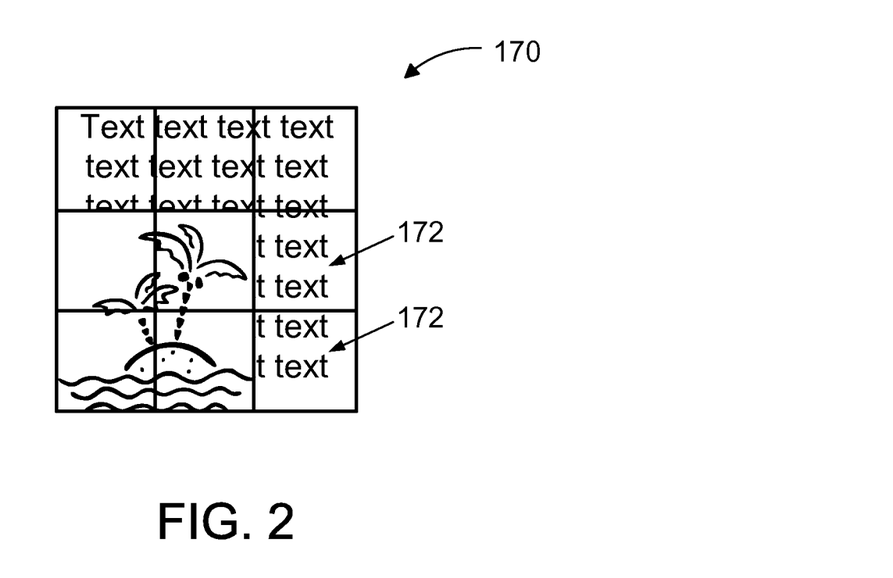
FIGS. 2 and 3 each include embodiments of an exemplary image that may be compressed and transmitted from the web server and the web client.

Web server 162 then determines the types of compression method that would be most suitable to use for each of the regions. In one embodiment, for example, web server 162 may determine a first data compression method, such as a lossy compression method as implemented by the JPEG format or a lossless compression method implemented by the PNG format, for a first set of the regions 172 and a second data compression method for a second set of the regions 172, wherein the second data compression method is different from the first data compression method. JPEG and PNG formats are described and discussed here for convenience since they represent standard image formats for web content, but other image encodings are possible. An important consideration is that the JPEG format (and corresponding lossy image compression) represents preferred encoding for certain image types, such as photographic images, while the PNG format (and corresponding lossless image compression) represents preferred encoding for vector-based images and text. For example, web server 162 may select the PNG format for the first set of regions 172 and the JPEG format for the second set of regions 172. Each set of regions 172 can include one or more regions of the image 172. Web server 162 then compresses the first set and the second set of regions using the image encoding/data compression method selected for each of the sets. The first set and the second set of regions 172 that have been compressed are then transmitted to web client 164, wherein the regions are decompressed. Additional sets of regions may be encoded with additional encoding schemes which may be preferable for additional image types or subtypes.

Accordingly, the embodiments described herein have the ability to perform multiple data compression methods on an image, rather than perform only one single data compression method on the entire image. In fact, by separating an image into regions and by selecting compression methods that are suitable to use for each of the regions, and by compressing, for example, the first set of the regions with one type of data compression method and the second set of regions with a second type of data compression method, the bandwidth that is required to transmit the image may be reduced while maintaining high image quality, and without significant increase in CPU resource requirements. As such, an increase of the load on host 110 and/or remote terminal 160 is substantially inhibited.

Figure 4:
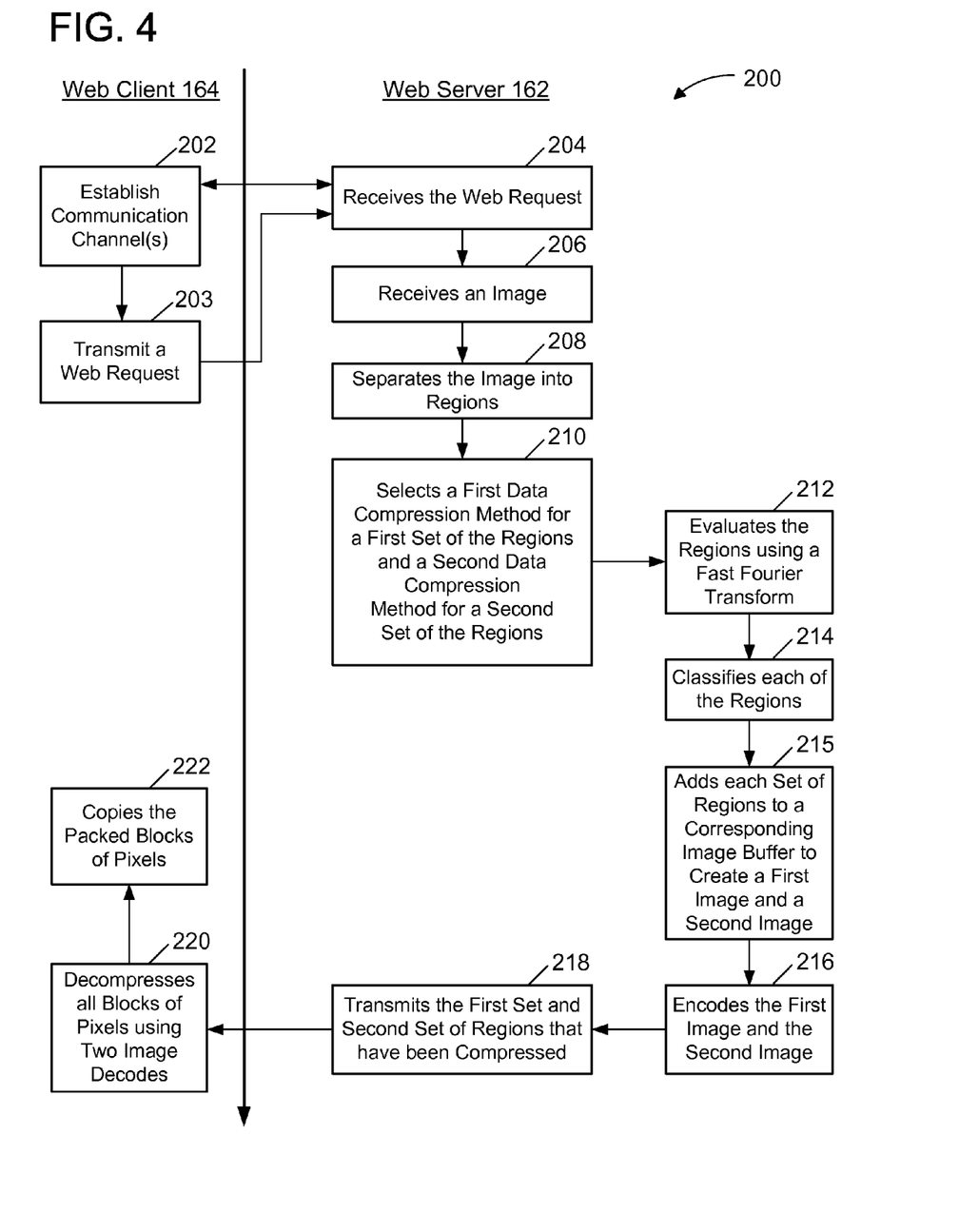
FIG. 4 is a swimlane diagram of an exemplary method for determining compression methods to use for an image to be transmitted from the web server to the web client.

FIG. 4 shows a swimlane diagram 200 of an exemplary method for determining compression methods to use for an image to be transmitted from the web server 162 located within the host 110 (shown in FIG. 1) to the web client 164 located within the remote terminal 160 (shown in FIG. 1). This method may be embodied within a plurality of computer-executable instructions stored in one or more memories, such as one or more computer-readable storage mediums. Computer storage mediums may include non-transitory and include volatile and nonvolatile, removable and non-removable mediums implemented in any method or technology for storage of information such as computer-readable instructions, data structures, program modules or other data. The instructions may be executed by one or more processors to perform the functions described herein.

In operation 202, web client 164 establishes one or more communication channels with web server 162, wherein the channel(s) facilitate communication between web client 164 and web server 162. More specifically, in operation 203, web client 164 transmits a web request, such as a GET request, to web server 162, wherein the web request corresponds to a request for an image (e.g., image 170 (shown in FIG. 2)). Web server 162 receives the request in operation 204. Web server 162 also receives image 170 that corresponds to the web request from desktop 117 (shown in FIG. 1) in operation 206, wherein image 170 may be an image or a component of an image of display 119 (shown in FIG. 1) that is being displayed on desktop 117.

Prior to transmitting image 170 to web client 164, web server 162 determines compression methods to use on image 170 such that image 170 is adequately and appropriately compressed prior to being transmitted to web client 164. In the exemplary embodiment, in operation 208, web server 162 breaks or separates image 170 into a plurality of regions 172 (shown in FIG. 2), wherein each of the regions 172 can be classified for being compressed better using a type of data compression method. In separating image 170 into regions 172, the web server 162 may select a region size as a multiple of the compression method macro blocks size, such as 16 pixels by 16 pixel squares, or blocks. Each pixel block, or region 172, may be treated as an individual image by web client 164 and web server 162.

Web server 162 then selects a compression method for each region 175. For example, in operation 210, the web server 162 may select a first data compression method, such as a lossy compression method or a lossless compression method, for a first set of the regions 172 and a second data compression method for a second set of the regions 172, wherein the second data compression method is different from the first data compression method. In the exemplary embodiment, web server 162 selects an appropriate compression method for each region 172 by evaluating a corresponding factor of compression of each region. More specifically, in operation 212, the web server 162 evaluates the regions 172 using a fast Fourier transform algorithm, such as a discrete cosine transform (DCT) algorithm. Rather than using a fast Fourier transform algorithm, web server 162 may perform other evaluations to select the preferred data compression method for each region.

In the exemplary embodiment, by operating on a sequence of a finite number of data points within each region 172 in terms of a sum of cosine functions oscillating at different frequencies, (i.e., as generated by well-known fast-Fourier transform algorithms) web server 162 is able identify which regions 172 contain a relatively large number of DCT components but only a small number of pixel colors, suggesting that these regions contain text and/or vector art, and therefore should be classified as belonging to a first set of regions, while regions that do not have a relatively large number of DTC components or small number of pixels should be classified as belonging to a second set of regions. Based at least in part on the fast Fourier transform, therefore, each region 172 is classified as belonging to either the first or second set of regions in operation 214.

Figure 3:
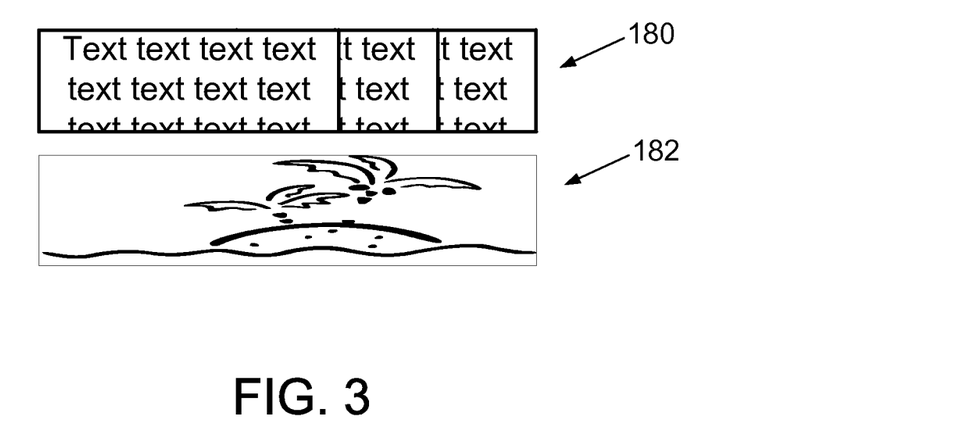

In one embodiment, as shown in operation 215, each set of regions 172 is added to a corresponding image buffer to create two images: a first image 180 (shown in FIG. 3) containing only regions that, based on a fast Fourier analysis are likely contain text or vector art, and a second image 182 (shown in FIG. 3) containing only regions that, based on the a fast Fourier analysis, are likely to contain photographic images or color gradients. In operation 216, web server 162 then encodes first image 180 into a PNG format which uses a lossless image data compression algorithm, and second image 182 into a JPEG format which uses a lossy image data compression algorithm.

In operation 218, first image 180 and second image 182 having corresponding first and second sets of regions are transmitted to web client 164, wherein the first and second images 180 and 182 are decompressed such that the image 170 may be displayed on a computer display (not shown) of the remote terminal 160. More specifically, in operation 220, web client 164 can efficiently decompress all blocks of pixels using 2 image decodes (one PNG image decode for the first image 180 and one JPEG image decode for the second image 182), and then, in operation 222, copying the packed blocks of pixels from the two images 180 and 182 to specific x, y offsets on the client's 164 screen. The offsets may be provided as metadata from server 162 along with the images 180 and 182. By separating the image 170 into regions 172 and by determining compression method suitable for each of the regions 172, and by compressing, for example, the first set of the regions with one type of data compression method and the second set of regions with a second type of data compression method, bandwidth that is required to transmit the image is substantially reduced when compared to using solely PNG or JPEG for the full screen image. As such, the CPU requirements for host 110 and/or remote terminal 160 are substantially reduced. Further bandwidth reduction may be achieved by quantizing, for example, the PNG image to a 256 color palette with relatively little loss in image quality. Because browser based clients can efficiently decode PNG or JPEG images and perform pixel block copy operations, the method 200 may be implemented on HTML5 clients without requiring any native code present.

Figure 5:
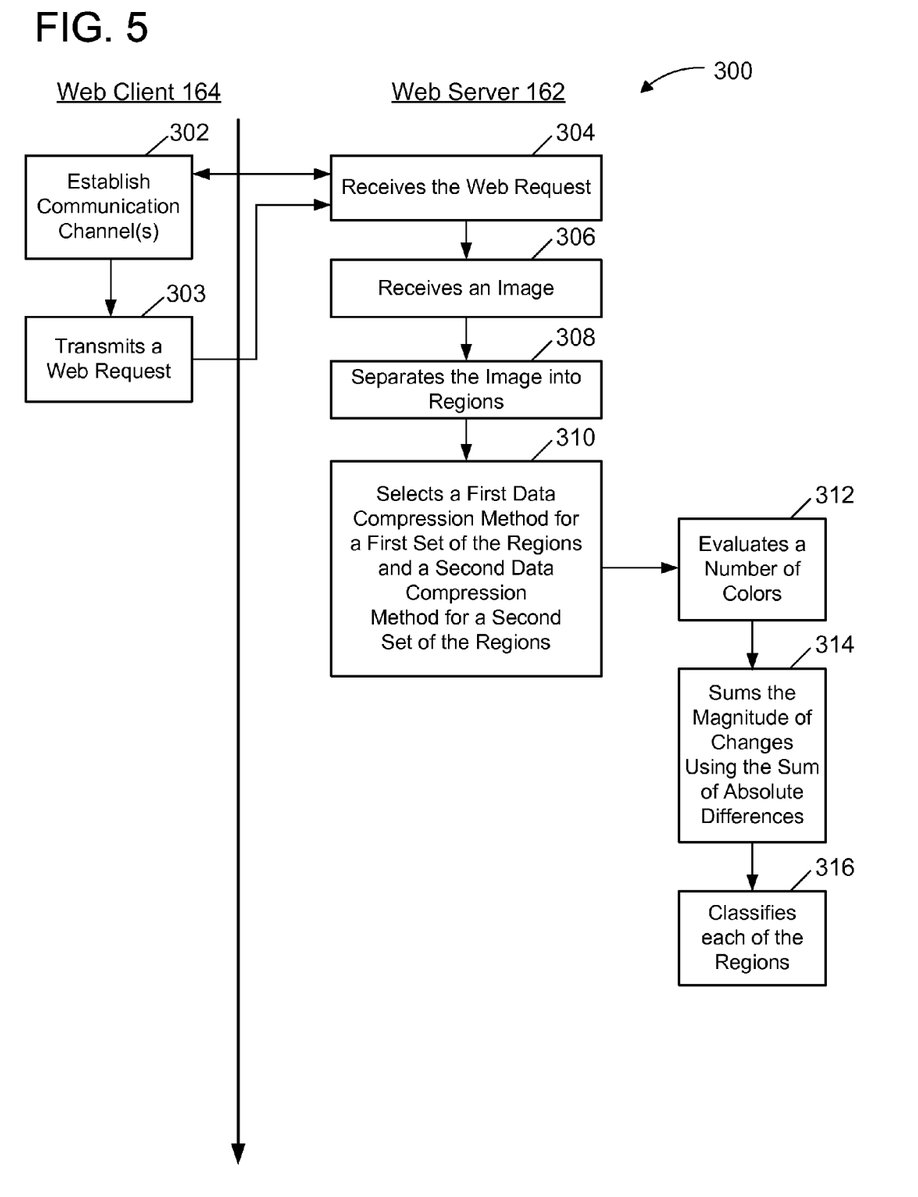
FIG. 5 is a swimlane diagram of an alternative method for determining compression methods to use for an image to be transmitted from the web server to the web client.

FIG. 5 is a swimlane diagram 300 of an alternative method for determining compression methods to use for an image (e.g., image 170 (shown in FIG. 2) to be transmitted from web server 162 to web client 164 in lieu of the method shown in FIG. 4. This method is embodied within a plurality of computer-executable instructions stored in one or more memories, such as one or more computer-readable storage mediums. Computer storage mediums may include non-transitory and include volatile and nonvolatile, removable and non-removable mediums implemented in any method or technology for storage of information such as computer-readable instructions, data structures, program modules or other data. The instructions may be executed by one or more processors to perform the functions described herein.

In operation 302, web client 164 establishes one or more communication channels with web server 162, wherein the channel(s) facilitate communication between web client 164 and web server 162. More specifically, in operation 303, web client 164 transmits a web request, such as a GET request, to web server 162, wherein the web request corresponds to a request for an image, such as image 170. Web server 162 receives the request in operation 304. Web server 162 also receives image 170 that corresponds to the web request from desktop 117 (shown in FIG. 1) in operation 306.

Prior to transmitting image 170 to web client 164, web server 162 determines compression methods to use on image 170 such that image 170 is adequately compressed prior to being transmitted to web client 164. In the exemplary embodiment, in operation 308, web server 162 breaks or separates image 170 into a plurality of regions 170 (shown in FIG. 2), wherein each of the regions 170 can be classified for being compressed better using a type of data compression method. In separating image 170 into regions 172, web server 162 may select a region size as a multiple of the compression method macro blocks size, such as pixels by 16 pixel squares, or blocks. Each pixel block, or region, may be treated as an individual image by web client 164 and web server 162.

Web server 162 then selects a compression method to use for each of the regions 172. For example, in operation 310, web server 162 may select a first data compression method, such as a lossy compression method or a lossless compression method, for a first set of the regions 172 and a second data compression method for a second set of the regions 172, wherein the second data compression method is different from the first data compression method. In the exemplary embodiment, a set of regions can include one or more regions of the image.

Web server 162, in the exemplary embodiment, makes the selection of the compression methods to use for the first set of the regions 172 and the second set of the regions 172 by evaluating a factor of compression of each of the first set and the second set. For example, in operation 312, in lieu of using a fast Fourier transform algorithm, as identified in operation 212 (shown in FIG. 2), web server 162 evaluates a number of colors, such as palette colors, present in each of the first set and the second set of regions. For example, web server 162 counts the number of color changes that occur across consecutive pixels in the horizontal and vertical directions of each of the first and second set of regions. This evaluation facilitates a rough proxy for evaluating the total number of colors within each of the first and set of regions 172 without having to do a full histogram analysis.

In operation 314, web server 162 sums the magnitude of changes between consecutive pixels in horizontal and vertical directions using the sum of absolute differences (SAD). Operation 314 provides a rough proxy for the number of frequency components required to encode the region 172 on the observation that sharp changes in pixel intensity produce high frequencies which often require more DCT components to encode. In operation 316, based on the evaluation of the total number of colors within regions 172 and based on the sum of absolute differences of regions 172, web server 162 classifies each region 170 as belonging to a first or second set of regions, wherein each of the first and second set of regions undergo a different compression method. For example, for the regions 170 that have more palette colors than a predefined threshold, they may be classified into a first set of regions that are classified to undergo a lossy compression method, such as a JPEG compression method. The regions 170 that have palette colors that are less than the predefined threshold may be classified into a second set of regions that are classified to undergo a lossless compression method, such as a PNG compression method. The classification or determination for lossy or lossless encoding can be done using, for example, the code listed in Listing 1 below.

| Listing 1 |
|---|
| if (tChanges<THRESHOLD1 \|\| tDiff/ tChanges < THRESHOLD2) then ENCODE_PNG elseENCODE_JPEG |

Moreover, web server 162 may then compress the first set and the second set of regions 172 using the selected compression methods and may transmit the first and second set of regions 172 to web client 164 pursuant to operations 215 to 218 (shown in FIG. 4). Web client 164 can then decompress the first and second set of regions 172 pursuant to operations 220 to 222 (shown in FIG. 4).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system.

Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising a server in communication with a client, wherein said server is configured to:
    separate an image into a plurality of regions;
    determine a first data compression method for a first set of the plurality of regions and a second data compression method for a second set of the plurality of regions, wherein the second data compression method is different from the first data compression method, and wherein each region of the first and second plurality of regions includes one or more blocks of pixels, each of the one or more blocks of pixels corresponding to a specific x, y offset in the image;
    compress the first set and the second set of the plurality of regions using the first data compression method and the second data compression method, respectively; and
    transmit the first set and the second set of the plurality of regions that have been compressed to the client.

2. The system of claim 1, wherein compressing the first set and the second set of the plurality of regions comprises:
    adding each of the first set and the second set of the plurality of regions to a corresponding image buffer to create a first image and a second image, respectively;
    encoding the first image into a first format using the first data compression method format; and
    encoding the second image into a second format using the second data compression method format.

3. The system of claim 1, wherein determining the first data compression method for the first set of the plurality of regions and the second data compression method for the second set of the plurality of regions comprises:
    evaluating a factor of compression of each of the first set and the second set; and
    based at least in part on the factor of compression of each of the first set and the second set, selecting the first data compression method for the first set and the second data compression method for the second set.

4. The system of claim 1, wherein determining the first data compression method for the first set of the plurality of regions and the second data compression method for the second set of the plurality of regions comprises:
    evaluating a fast Fourier transform of each of the first set and the second set; and
    based at least in part on the fast Fourier transform of each of the first set and the second set, selecting the first data compression method for the first set and the second data compression method for the second set.

5. The system of claim 4, wherein evaluating a fast Fourier transform of each of the first set and the second set comprises evaluating a discrete cosine transform of each of the first set and the second set.

6. The system of claim 1, wherein determining the first data compression method for the first set of the plurality of regions and the second data compression method for the second set of the plurality of regions comprises:
    evaluating a number of pallete colors present in each of the first set and the second set;
    evaluating a sum of differences of each of the first set and the second set; and
    based at least in part on the number of pallete colors present in each of the first set and the second set and based at least in part on the sum of differences of each of the first set and the second set, selecting the first data compression method for the first set and the second data compression method for the second set.

7. The system of claim 1, wherein determining the first data compression method for the first set of the plurality of regions and the second data compression method for the second set of the plurality of regions comprises:
    evaluating a frequency approximation of each of the first set and the second set; and
    based at least in part on the frequency approximation of each of the first set and the second set, selecting the first data compression method for the first set and the second data compression for the second set.

8. The system of claim 1, wherein each pixel in the image is included in no more than one region of the plurality of regions.

9. The system of claim 1, wherein each block of pixels in the one or more blocks of pixels are included in either the first set of the plurality of regions or the second set of the plurality of regions.

10. At least one computer-readable storage medium having computer-executable instructions embodied thereon, wherein, when executed by at least one processor, the computer-executable instructions cause the at least one processor to:
    separate an image into a plurality of regions;
    determine a first data compression method for a first set of the plurality of regions and a second data compression method for a second set of the plurality of regions, wherein the second data compression method is different from the first data compression method, and wherein each region of the first and second plurality of regions includes one or more blocks of pixels, each of the one or more blocks of pixels corresponding to a specific x, y offset in the image;
    compress the first set and the second set of the plurality of regions using the first data compression method and the second data compression method, respectively; and
    transmit the first set and the second set of the plurality of regions that have been compressed to a client.

11. The at least one computer-readable storage medium of claim 10, wherein the first data compression method uses a Joint Photographic Experts Group (JPEG) format or a Portable Network Graphics (PNG) format, and wherein the second data compression method uses the other of the JPEG format and the PNG format.

12. The at least one computer-readable storage medium of claim 10, wherein compressing the first set and the second set of the plurality of regions comprises:
adding each of the first set and the second set of the plurality of regions to a corresponding image buffer to create a first image and a second image, respectively;
encoding the first image into a first format using the first data compression method format; and
encoding the second image into a second format using the second data compression method format.

13. The at least one computer-readable storage medium of claim 10, wherein determining the first data compression method for the first set of the plurality of regions and the second data compression method for the second set of the plurality of regions comprises:
evaluating a factor of compression of each of the first set and the second set; and
based at least in part on the factor of compression of each of the first set and the second set, selecting the first data compression method for the first set and the second data compression method for the second set.

14. The at least one computer-readable storage medium of claim 10, wherein determining the first data compression method for the first set of the plurality of regions and the second data compression method for the second set of the plurality of regions comprises:
evaluating a fast Fourier transform of each of the first set and the second set; and
based at least in part on the fast Fourier transform of each of the first set and the second set, selecting the first data compression method for the first set and the second data compression method for the second set.

15. The at least one computer-readable storage medium of claim 14, wherein evaluating a fast Fourier transform of each of the first set and the second set comprises evaluating a discrete cosine transform of each of the first set and the second set.

16. The at least one computer-readable storage medium of claim 10, wherein determining the first data compression method for the first set of the plurality of regions and the second data compression method for the second set of the plurality of regions comprises:
evaluating a number of pallete colors present in each of the first set and the second set;
evaluating a sum of differences of each of the first set and the second set; and
based at least in part on the number of pallete colors present in each of the first set and the second set and based at least in part on the sum of differences of each of the first set and the second set, selecting the first data compression method for the first set and the second data compression method for the second set.

17. The at least one computer-readable storage medium of claim 10, wherein determining the first data compression method for the first set of the plurality of regions and the second data compression method for the second set of the plurality of regions comprises:
evaluating a frequency approximation of each of the first set and the second set; and
based at least in part on the frequency approximation of each of the first set and the second set, selecting the first data compression method for the first set and the second data compression method for the second set.

18. A method for determining compression methods to use for an image, said method comprising:
separating the image into a plurality of regions;
determining, by a processor, a first data compression method for a first set of the plurality of regions and a second data compression method for a second set of the plurality of regions, wherein the second data compression method is different from the first data compression method, and wherein each region of the first and second plurality of regions includes one or more blocks of pixels, each of the one or more blocks of pixels corresponding to a specific x, y offset in the image;
compressing the first set and the second set of the plurality of regions using the first data compression method and the second data compression method, respectively; and
transmitting the first set and the second set of the plurality of regions that have been compressed to a client.

19. The method of claim 18, wherein compressing the first set and the second set of the plurality of regions comprises:
adding each of the first set and the second set of the plurality of regions to a corresponding image buffer to create a first image and a second image, respectively;
encoding the first image into a first format using the first data compression method format; and
encoding the second image into a second format using the second data compression method format.

20. The method of claim 18, wherein determining a first data compression method for a first set of the plurality of regions and a second data compression method for a second set of the plurality of regions comprises:
evaluating a fast Fourier transform of each of the first set and the second set; and
based at least in part on the fast Fourier transform of each of the first set and the second set, selecting the first data compression method for the first set and the second data compression method for the second set.

21. The method of claim 18, wherein determining a first data compression method for a first set of the plurality of regions and a second data compression method for a second set of the plurality of regions comprises:
evaluating a number of pallete colors present in each of the first set and the second set;
evaluating a sum of differences of each of the first set and the second set; and
based at least in part on the number of pallete colors present in each of the first set and the second set and based at least in part on the sum of differences of each of the first set and the second set, selecting the first data compression method for the first set and the second data compression method for the second set.

22. A system comprising a client in communication with a server, wherein said client is configured to:
receive a first compressed image from the server, the first compressed image being compressed by the server using a first data compression method;
receive a second compressed image from the server, the second compressed image being compressed by the server using a second data compression method;
decompress the first compressed image using a first image decode corresponding to the first data compression method, wherein the first decompressed image includes a first plurality of regions;
decompress the second compressed image using a second image decode corresponding to the second data compression method, wherein the second decompressed image includes a second plurality of regions; and
generate a final image by combining the first plurality of regions with the second plurality of regions, wherein each region of the first and second plurality of regions includes one or more blocks of pixels, each of the one or more blocks of pixels corresponding to a specific x, y offset in the final image.

23. The system of claim 22, wherein generating the final image comprises adding each of the one or more blocks of pixels to the corresponding specific x, y offset of in the final image.

* * * * *